US011750046B2

(12) United States Patent
Bhargava et al.

(10) Patent No.: US 11,750,046 B2
(45) Date of Patent: Sep. 5, 2023

(54) ELECTRIC MOTOR FOR AN APPLIANCE

(71) Applicant: WHIRLPOOL CORPORATION, Benton Harbor, MI (US)

(72) Inventors: Krati Bhargava, Stevensville, MI (US); Fang Deng, Novi, MI (US); James Hull, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 204 days.

(21) Appl. No.: 17/204,989

(22) Filed: Mar. 18, 2021

(65) Prior Publication Data

US 2022/0302772 A1    Sep. 22, 2022

(51) Int. Cl.
| | |
|---|---|
| *H02K 1/14* | (2006.01) |
| *H02K 1/02* | (2006.01) |
| *H02K 1/18* | (2006.01) |
| *H02K 5/24* | (2006.01) |
| *H02K 7/14* | (2006.01) |

(52) U.S. Cl.
CPC ............. *H02K 1/145* (2013.01); *H02K 1/02* (2013.01); *H02K 1/18* (2013.01); *H02K 5/24* (2013.01); *H02K 7/14* (2013.01)

(58) Field of Classification Search
CPC ...... B60L 58/26; D06F 37/267; D06F 37/304; H02K 1/02; H02K 1/145; H02K 1/18; H02K 1/187; H02K 15/12; H02K 3/522; H02K 5/225; H02K 5/24; H02K 7/14

See application file for complete search history.

(56) References Cited

U.S. PATENT DOCUMENTS

| | | | |
|---|---|---|---|
| 5,145,329 A | * | 9/1992 | Zumbusch ............... H02K 5/12 417/356 |
| 7,562,542 B2 | | 7/2009 | Choi |
| 7,615,895 B2 | | 11/2009 | Lee et al. |
| 7,652,406 B2 | | 1/2010 | Kim et al. |
| 7,750,531 B2 | | 7/2010 | Kim |
| 7,755,228 B2 | | 7/2010 | Kim et al. |

(Continued)

FOREIGN PATENT DOCUMENTS

| | | | | |
|---|---|---|---|---|
| AU | 2004226978 B2 | * | 6/2010 | ........... D06F 37/206 |
| EP | 1550758 | | 7/2005 | |

(Continued)

OTHER PUBLICATIONS

KR-101033570-B1, all pages (Year: 2011).*
AU-2004226978-B2, all pages, Choi (Year: 2010).*
WO-2011144539-A1, all pages, Donmez (Year: 2011).*

*Primary Examiner* — Naishadh N Desai
(74) *Attorney, Agent, or Firm* — Price Heneveld LLP

(57) ABSTRACT

A stator for an appliance motor includes an annular core made up of a metallic plate that is spirally wound into a laminated structure. An overmold extends around the core and further defines an interior section and a bridge section that extends between the core and the interior section. The interior section includes stator fastening portions that are used to attach the stator to a tub. The bridge section includes a first radial structure that extends from the interior section to the core. The bridge section includes a second radial structure that extends from the interior section to the core. The core, the interior section and the first and second radial structures define a toroidal cavity within the bridge section.

17 Claims, 21 Drawing Sheets

(56) References Cited

U.S. PATENT DOCUMENTS

| | | |
|---|---|---|
| 7,952,254 B2 | 5/2011 | Cho et al. |
| 8,344,584 B2 | 1/2013 | Ahn et al. |
| 8,567,043 B2 | 10/2013 | Horst et al. |
| 8,616,028 B2 | 12/2013 | Kim et al. |
| 8,621,896 B2 | 1/2014 | Kim et al. |
| 8,816,542 B2 | 8/2014 | Kim |
| 8,946,954 B2 | 2/2015 | Peterson et al. |
| 8,978,425 B2 | 3/2015 | Lee |
| 9,000,639 B2 | 4/2015 | Bailey et al. |
| 9,054,570 B2 | 6/2015 | Jang et al. |
| 9,318,927 B2 | 4/2016 | Kim |
| 9,634,529 B2 | 4/2017 | Hill et al. |
| 9,906,084 B2 | 2/2018 | Duncan et al. |
| 10,003,236 B2 | 6/2018 | Bailey et al. |
| 10,047,467 B2 | 8/2018 | Kim et al. |
| 10,135,313 B2 | 11/2018 | Jang et al. |
| 2004/0068857 A1* | 4/2004 | Park ............ H02K 1/187 29/605 |
| 2007/0163306 A1 | 7/2007 | Kim et al. |
| 2013/0009513 A1 | 1/2013 | Jang et al. |
| 2013/0214637 A1 | 8/2013 | Hill et al. |

FOREIGN PATENT DOCUMENTS

| | | | |
|---|---|---|---|
| EP | 2036190 | 12/2007 | |
| EP | 1529870 | 10/2016 | |
| KR | 20080076056 A | 8/2008 | |
| KR | 101033570 B1 * | 4/2011 | |
| KR | 101033570 B1 | 5/2011 | |
| KR | 101208502 | 12/2012 | |
| WO | WO-2011144539 A1 * | 11/2011 | ............ D06F 37/203 |

\* cited by examiner

ELECTRIC MOTOR FOR AN APPLIANCE

FIELD OF THE DEVICE

The device is in the field of electric motors, and more specifically, an electric motor configured as a direct drive motor for a laundry appliance. Direct drive motors are typically attached to a tub of a laundry appliance and provide rotational force to a rotating drum and one or more components within the rotating drum for treating laundry. Electric motors are also attached to the tub or other structures within an appliance and used as a belt-drive configuration for driving the rotating drum and the ancillary components for treating laundry.

SUMMARY OF THE DISCLOSURE

According to one aspect of the present disclosure, an electric motor for an appliance includes a tub. A metallic hub is molded within the tub to define a rotational axis. A drum is rotationally operable within the tub along the rotational axis. A stator is attached to the metallic hub and a rotor rotationally operates about the stator. The stator includes an annular core made up of a laminated structure. An overmold extends around the core. Fastening portions are located within an interior section of the overmold that is located within a central area of the core. A bridge section of the overmold extends from the interior section to at least one of an area above the core and an area below the core. The bridge section defines a toroidal cavity that extends between the core and the fastening portions.

According to another aspect of the present disclosure, a stator for an appliance motor includes an annular core made up of a metallic plate that is spirally wound into a laminated structure. An overmold extends around the core and further defines an interior section and a bridge section that extends between the core and the interior section. The interior section includes stator fastening portions that are used to attach the stator to a tub. The bridge section includes a first radial structure that extends from the interior section to the core. The bridge section includes a second radial structure that extends from the interior section to the core. The core, the interior section and the first and second radial structures define a toroidal cavity within the bridge section.

According to yet another aspect of the present disclosure, an electric motor for an appliance includes a tub. A metallic hub is molded within the tub to define a rotational axis. A drum is rotationally operable within the tub along the rotational axis. A stator is attached to the metallic hub and a rotor rotationally operates about the stator. The stator includes an annular core made up of a laminated structure. An overmold extends around the core and extends into a central area of the core. Fastening portions are located within an interior section of the overmold that is located within the central area of the core. A bridge section of the overmold extends from the interior section to the core. The bridge section includes a first radial structure, a second radial structure and an axial reinforcement. The first radial structure, the axial reinforcement and the second radial structure defines an undulating reinforcing structure that extends between the interior section and the core.

These and other features, advantages, and objects of the present disclosure will be further understood and appreciated by those skilled in the art by reference to the following specification, claims, and appended drawings.

Figure 1:
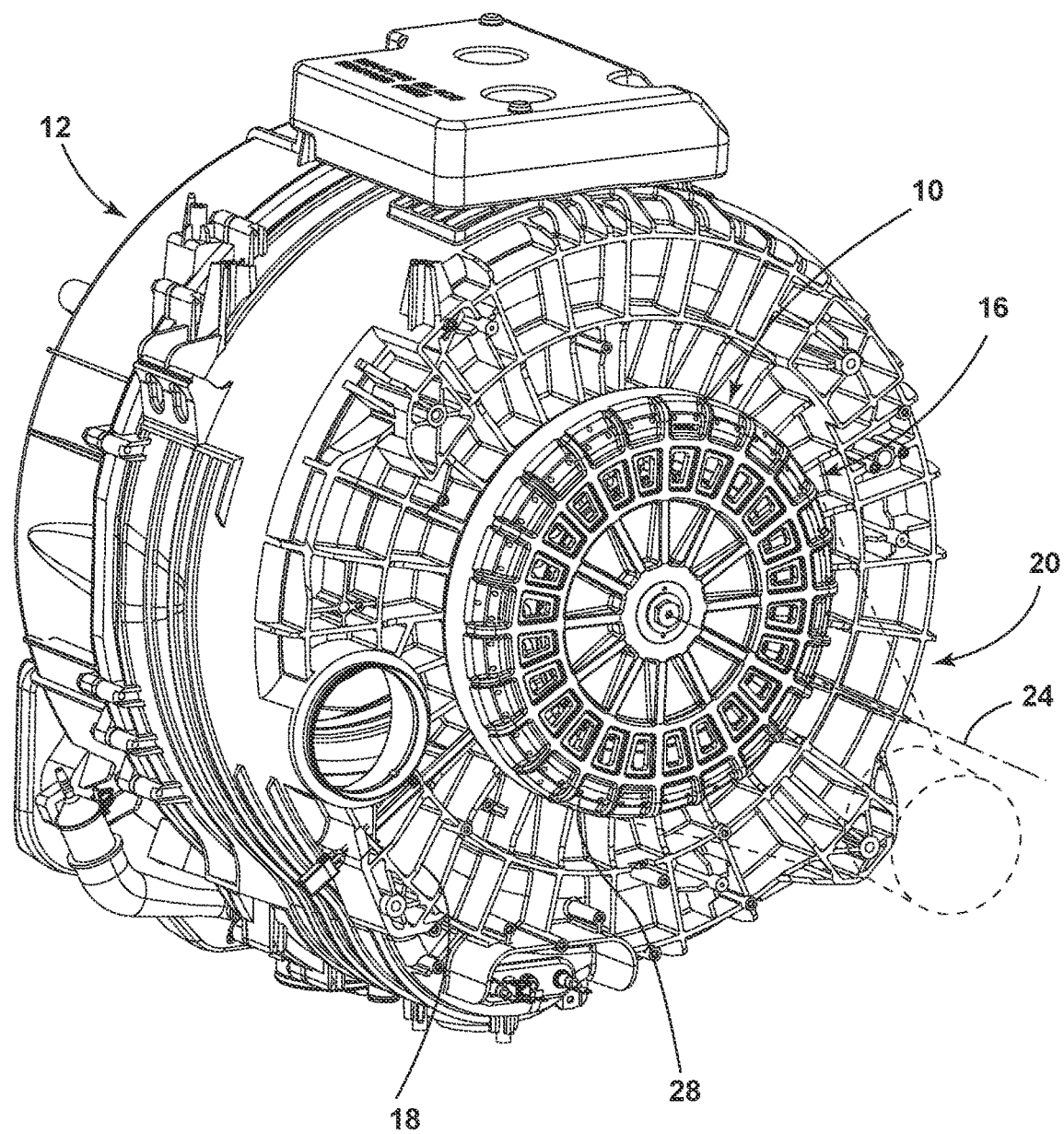
FIG. 1 is a perspective view of a direct drive motor for a laundry appliance attached to an outer drum, and shown with the outer cabinet removed.
Figure 2:
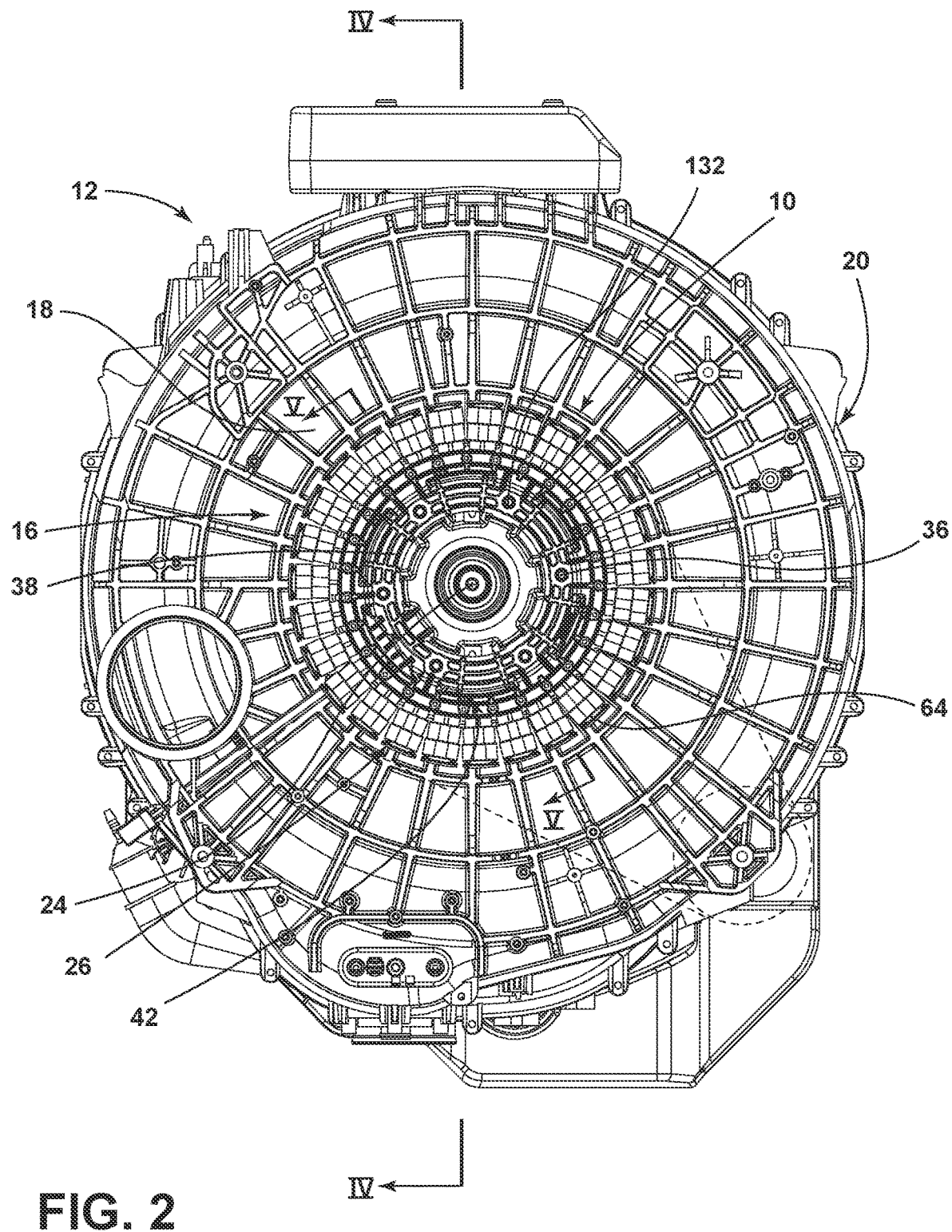
FIG. 2 is an elevational view of the direct drive motor of FIG. 1.
Figure 3:
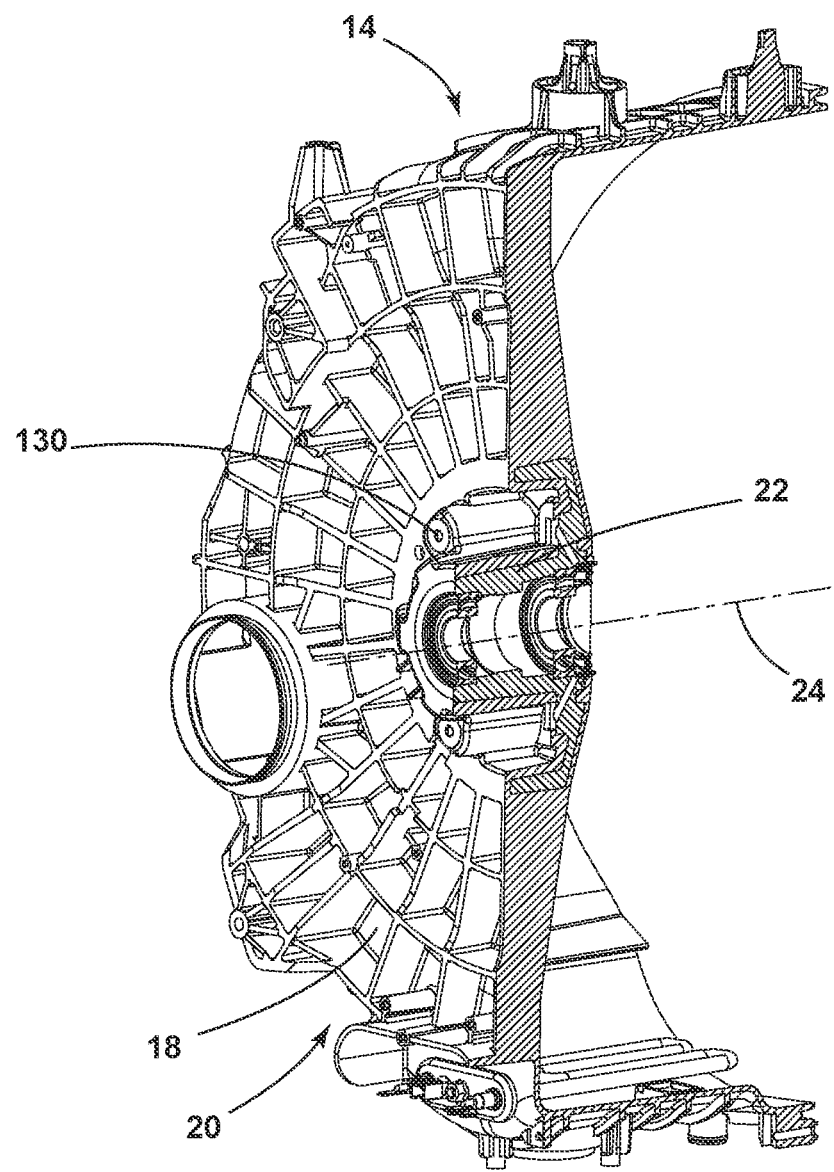
FIG. 3 is a cross-sectional view of the structural tub of FIG. 1, with the electric motor removed and showing an aspect of a metallic hub molded within the back wall of the tub.
Figure 4:
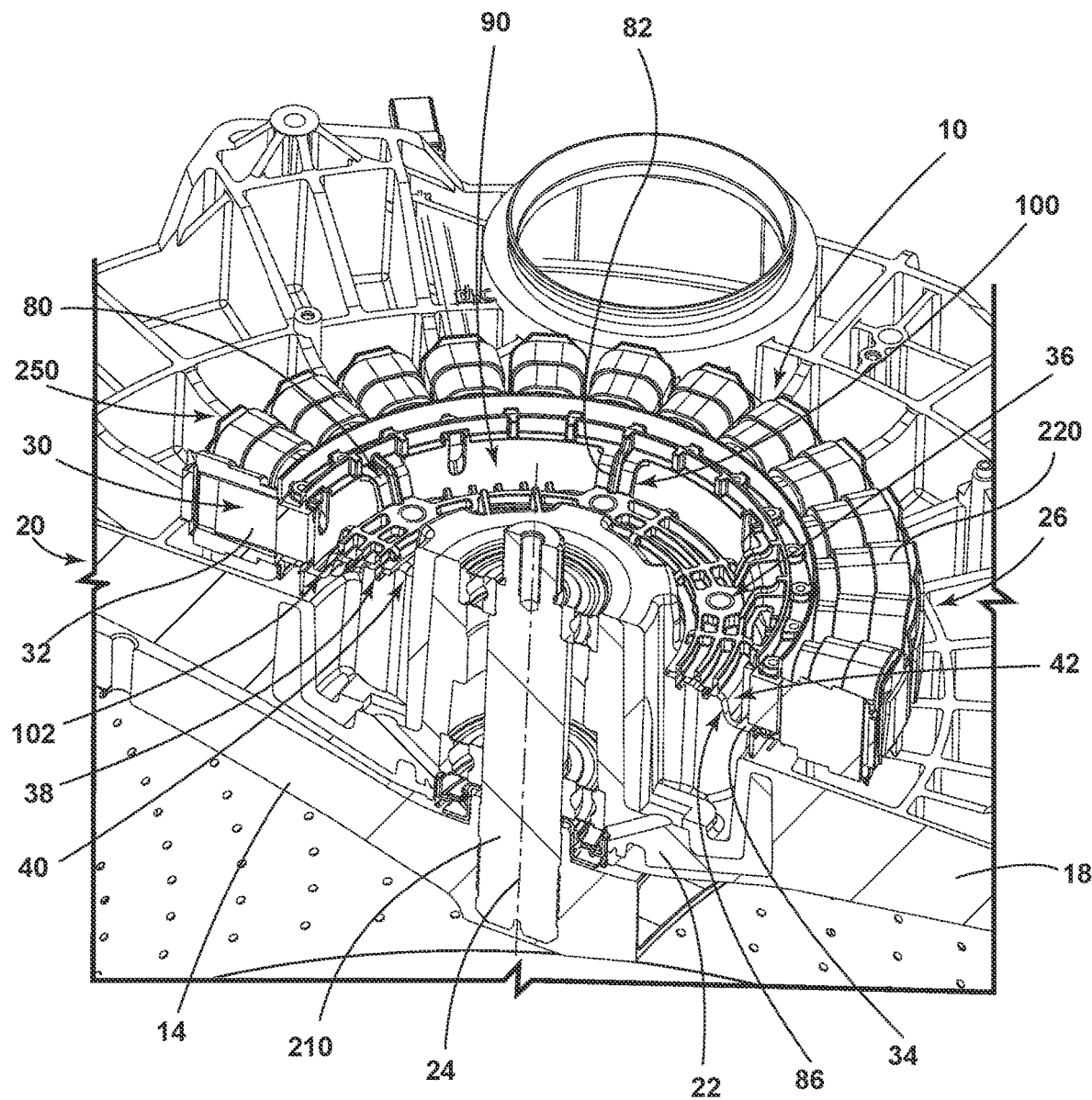
FIG. 4 is a cross-sectional view of the electric motor of FIG. 2 taken along line IV-IV.
Figure 5:
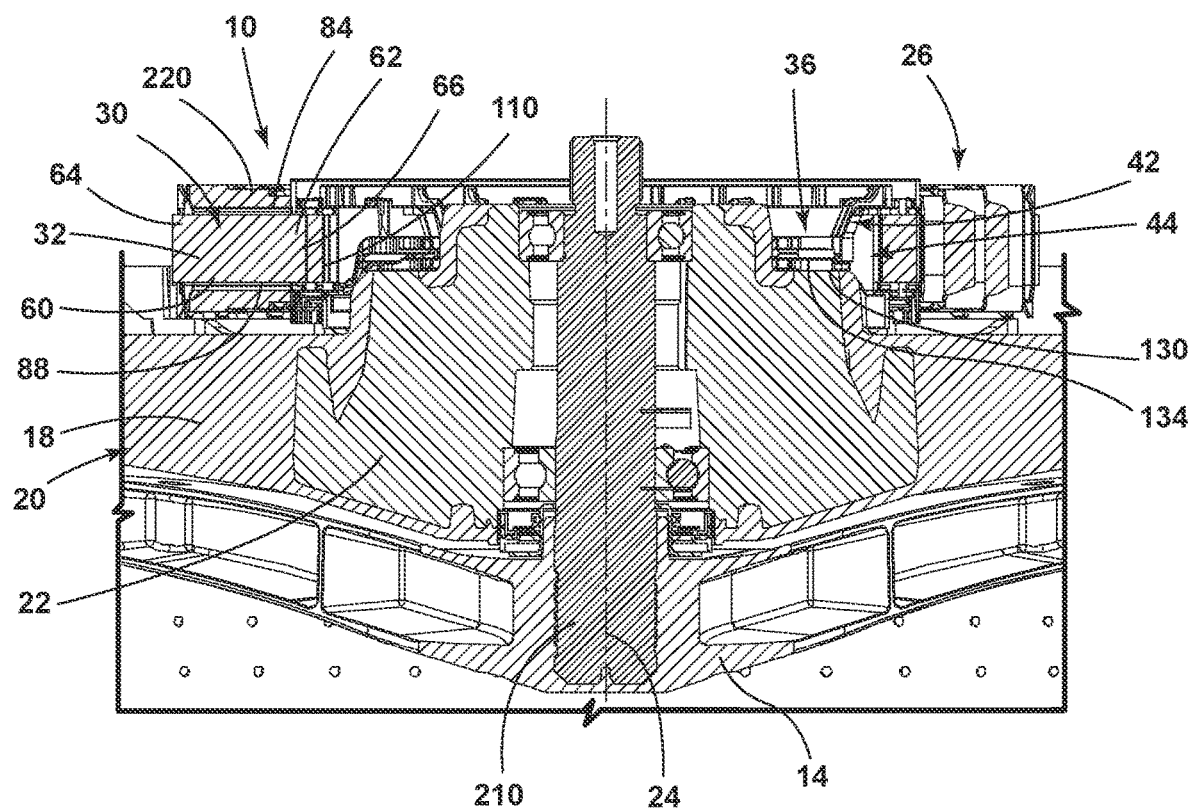
FIG. 5 is an enlarged cross-sectional view of the direct drive motor of FIG. 2 taken along line V-V.
Figure 6:
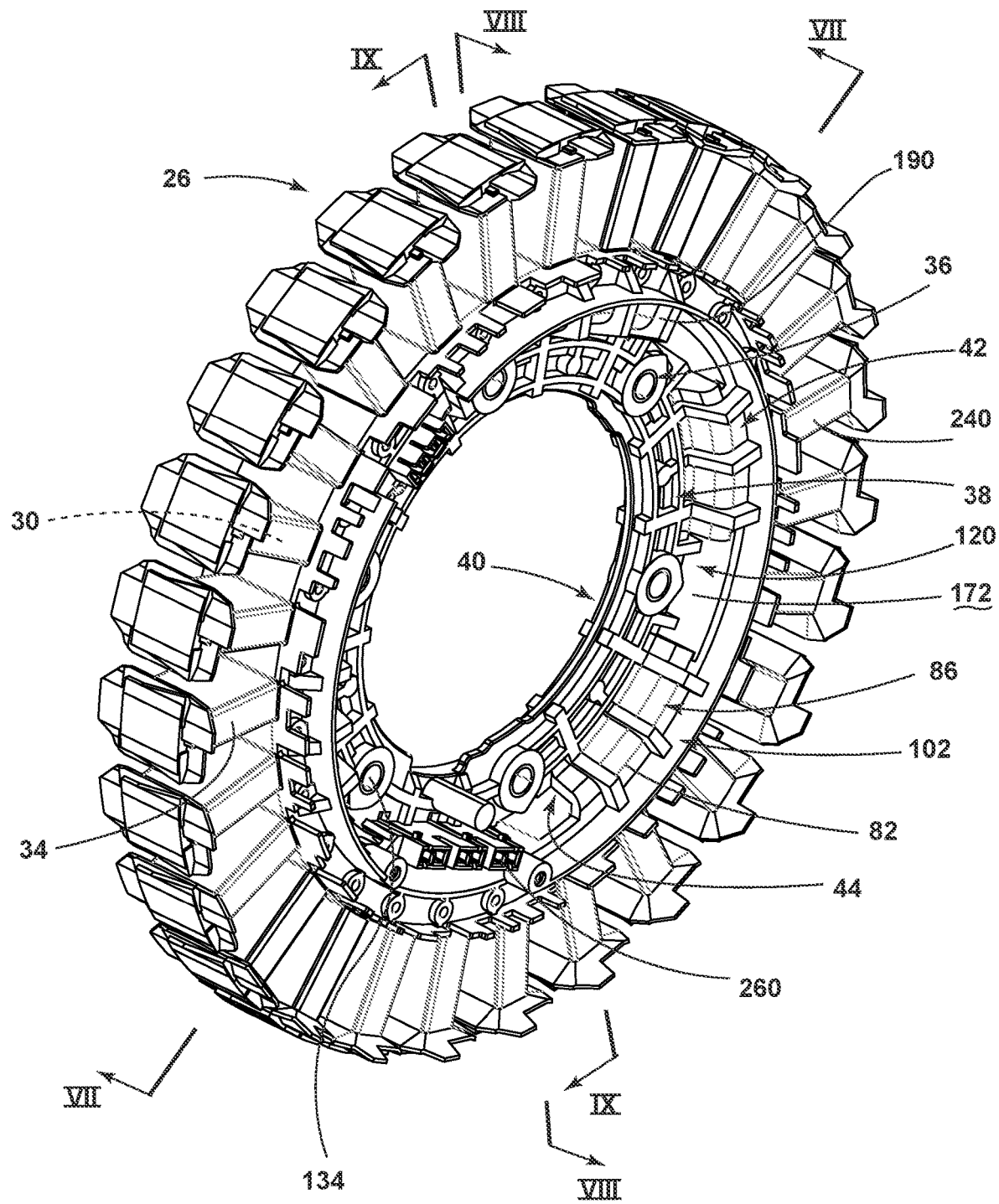
FIG. 6 is a perspective view of an aspect of the stator for the electric motor.
Figure 7:
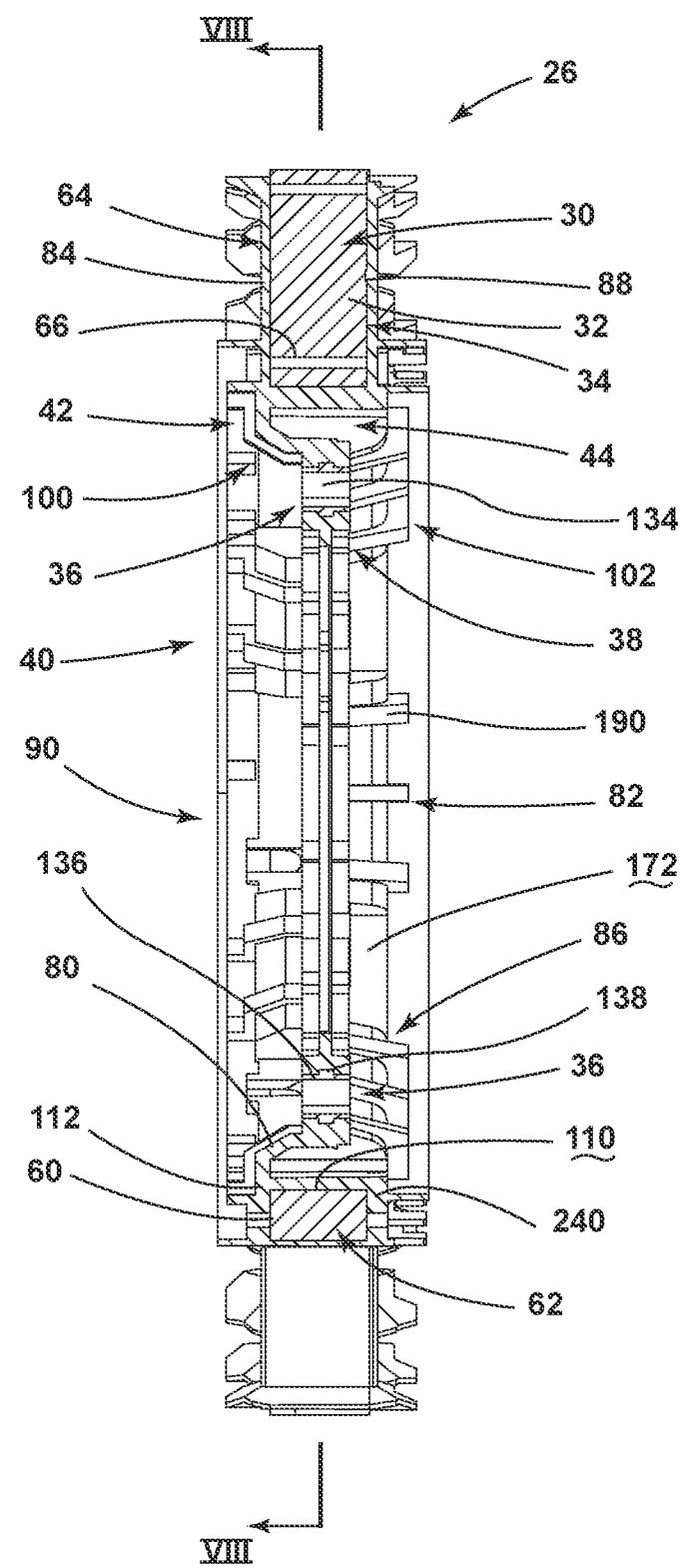
FIG. 7 is a cross-sectional view of the stator of FIG. 6, taken along line VII-VII.
Figure 8:
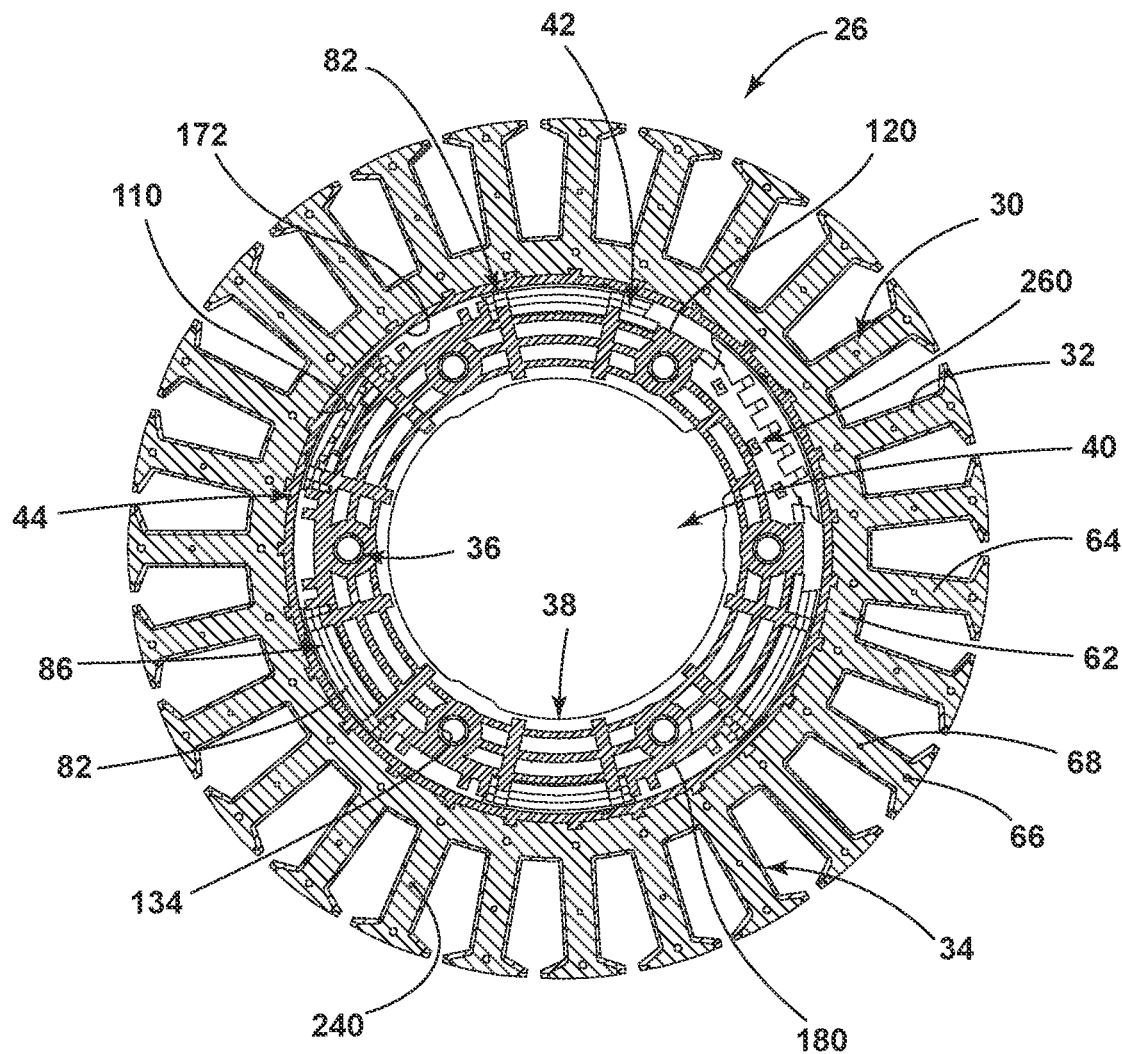
FIG. 8 is a cross-sectional view of the stator of FIG. 6, taken along line VIII-VIII.
Figure 9:
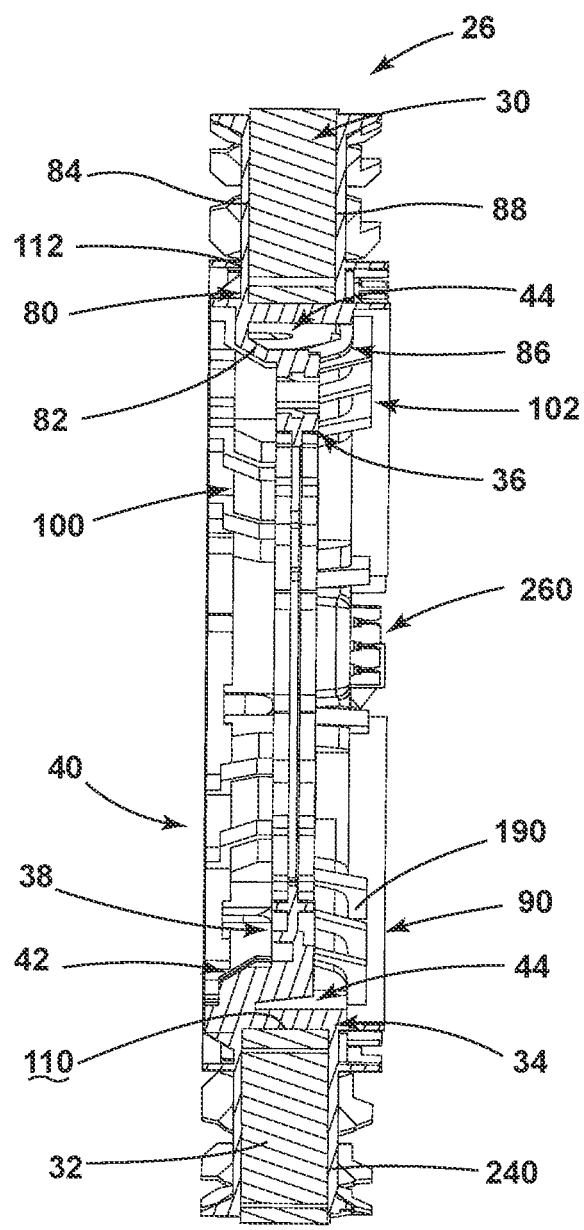
FIG. 9 is a cross sectional view of the stator of FIG. 6, taken along line IX-IX.
Figure 10:
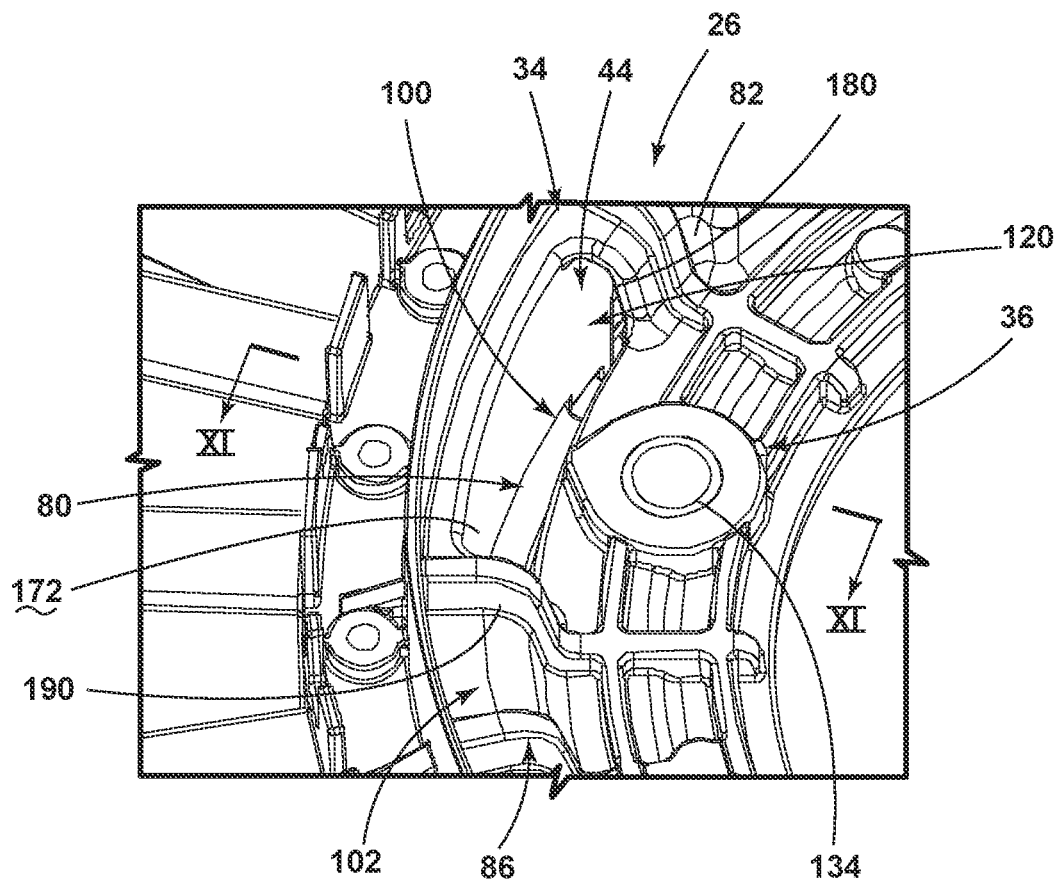
FIG. 10 is a perspective view of an aspect of a fastening portion of the stator of FIG. 6.
Figure 11:
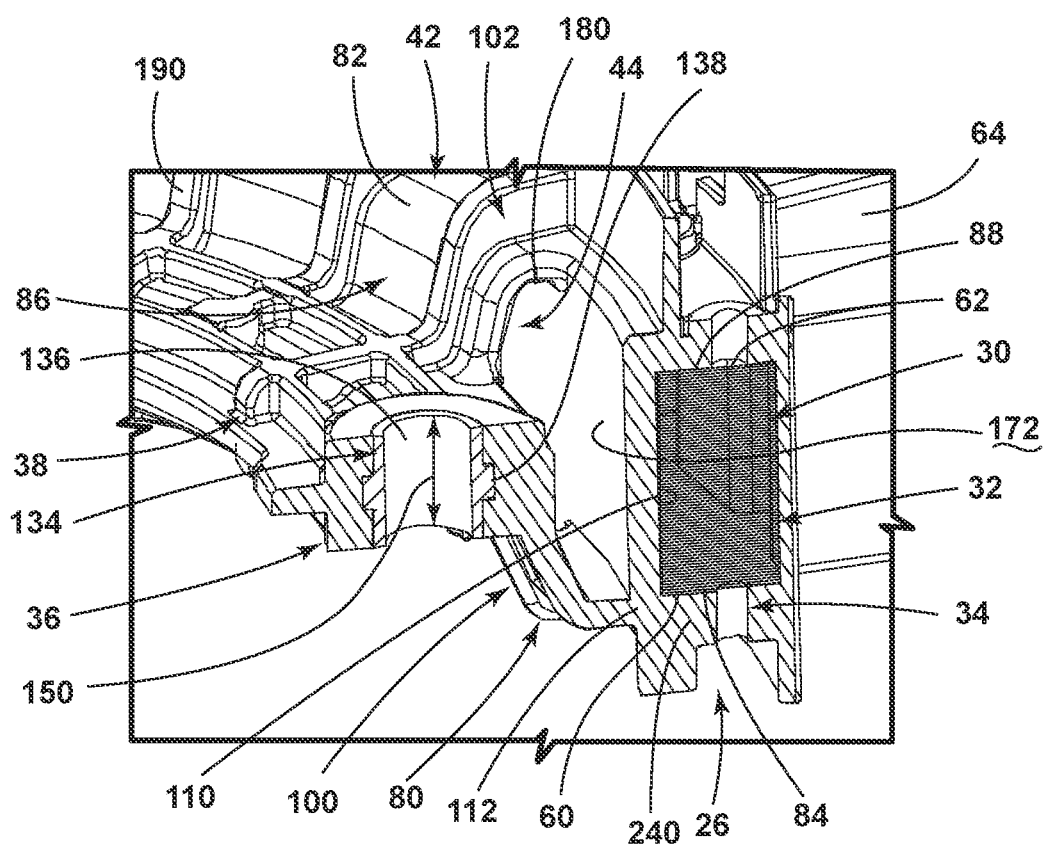
FIG. 11 is a cross-sectional view of the stator fastening portion of FIG. 10 taken along line XI-XI.
Figure 12:
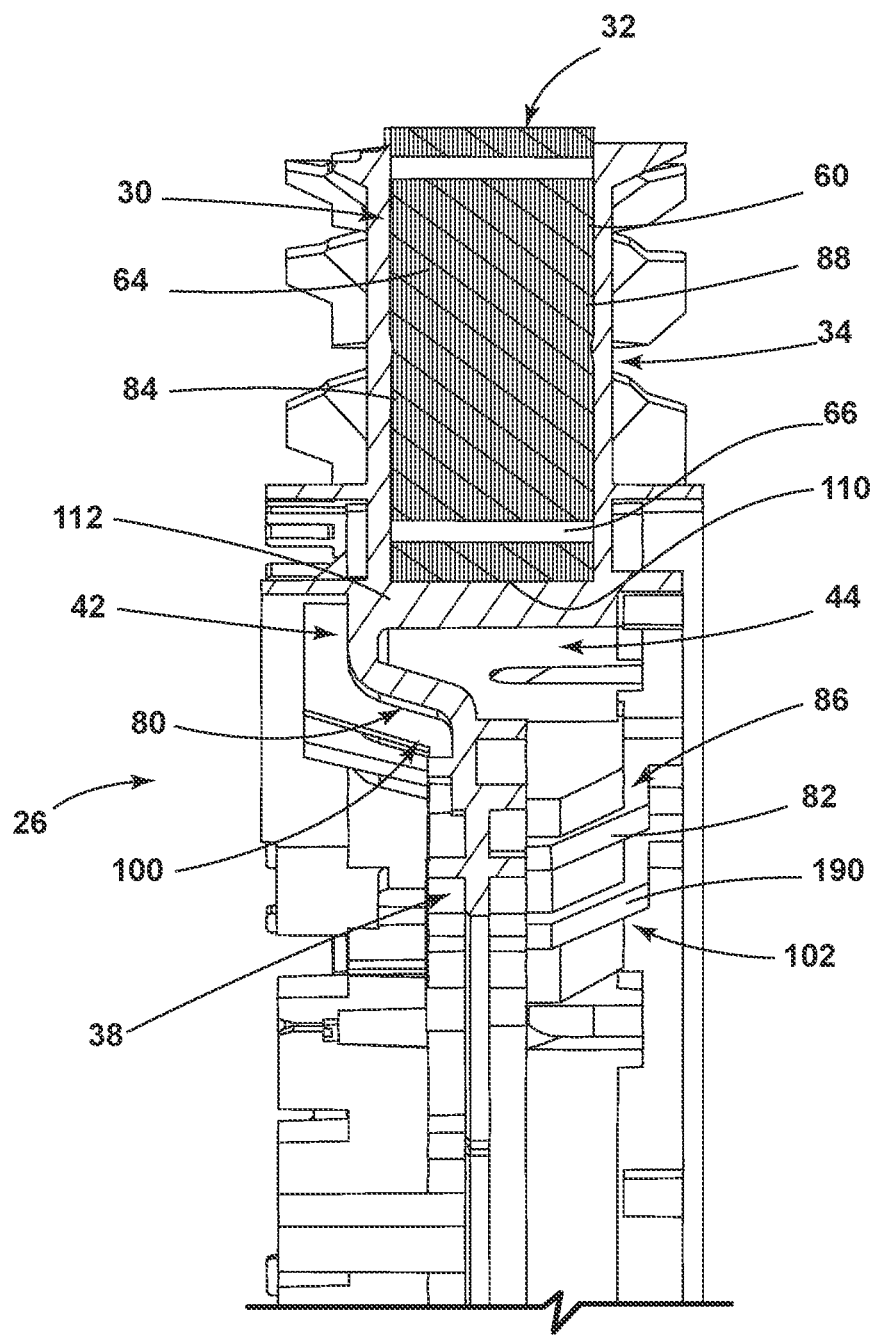
FIG. 12 is a cross-sectional view of the stator of FIG. 7 taken through a first radial structure.
Figure 13:
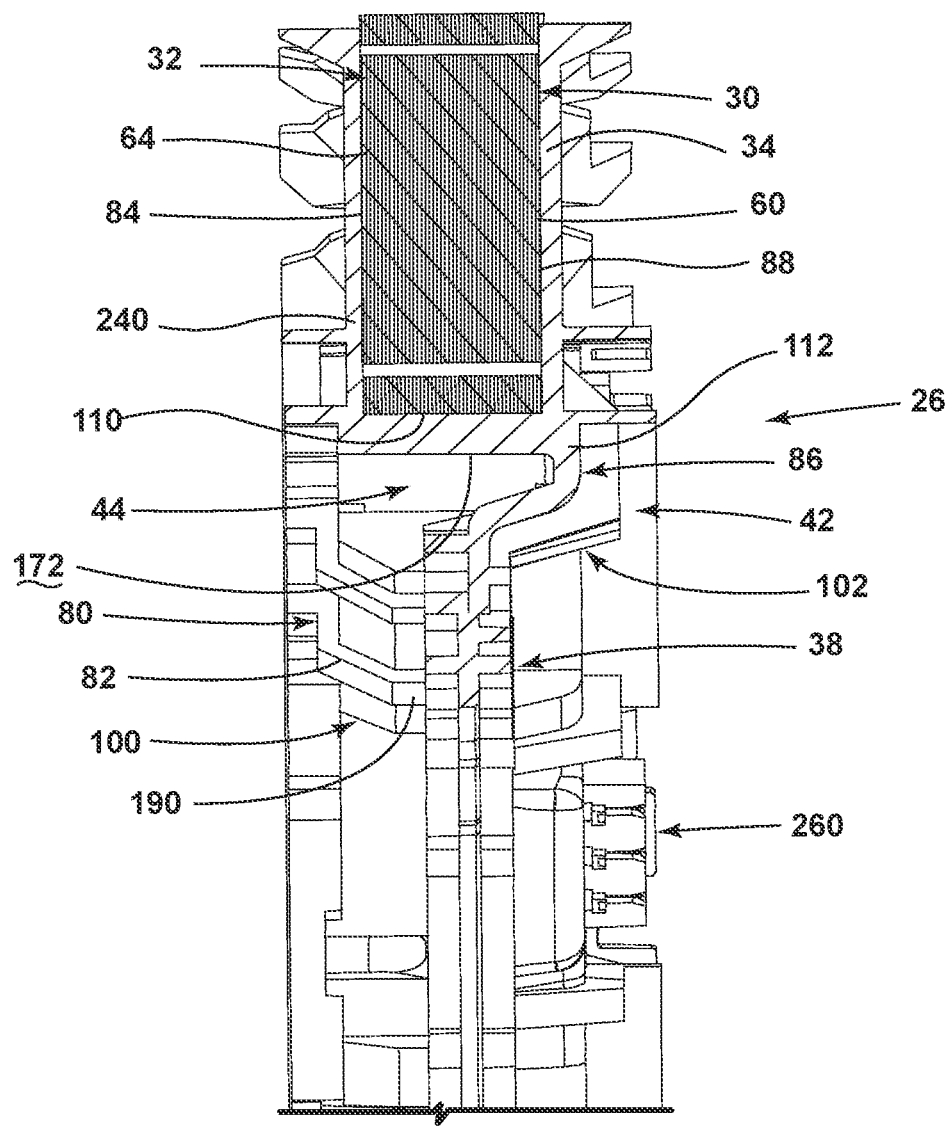
FIG. 13 is a cross-sectional view of the stator of FIG. 7 taken through a second radial structure.
Figure 14:
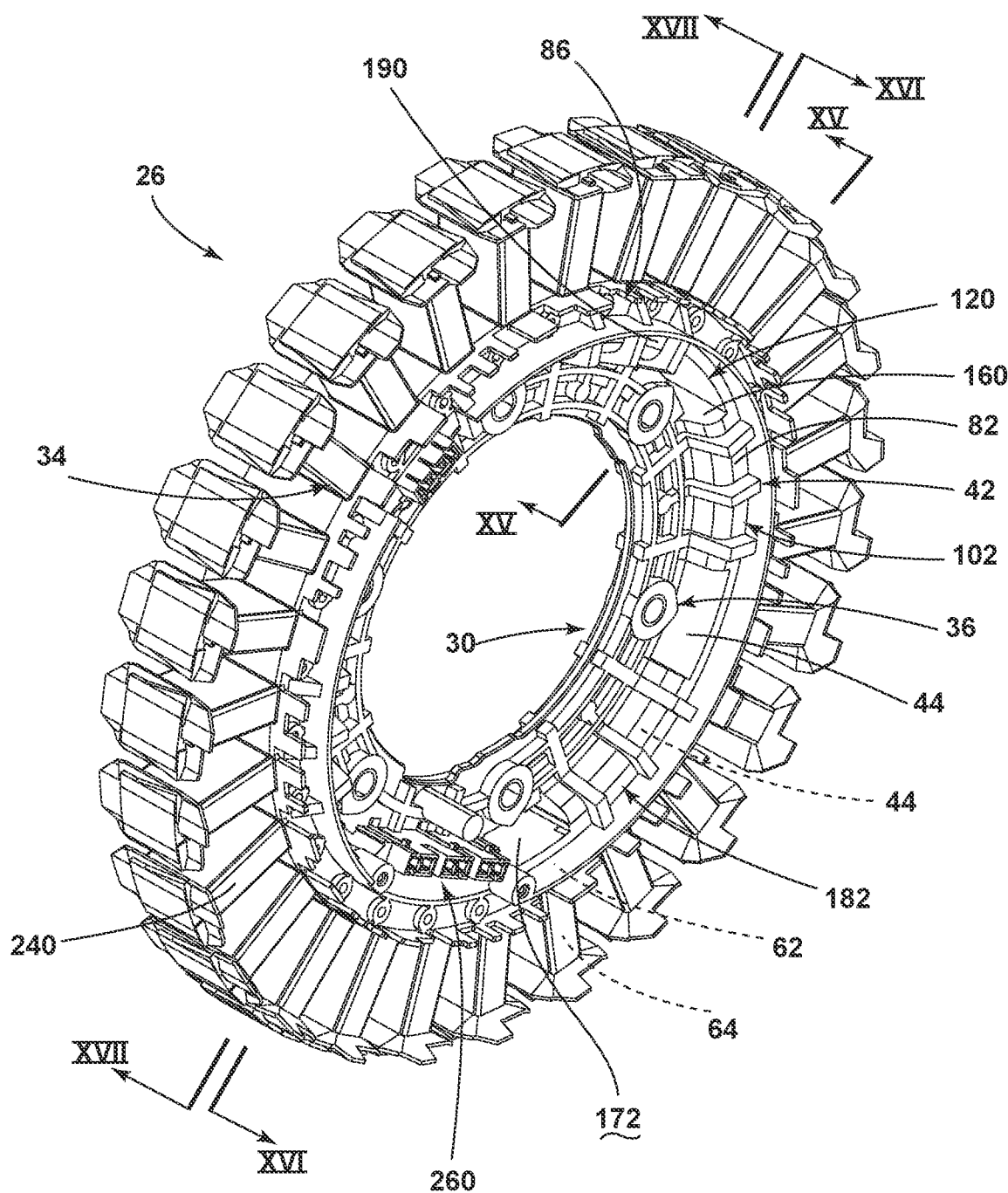
FIG. 14 is a perspective view of an aspect of a stator for the electric motor and including axial reinforcing walls.
Figure 15:
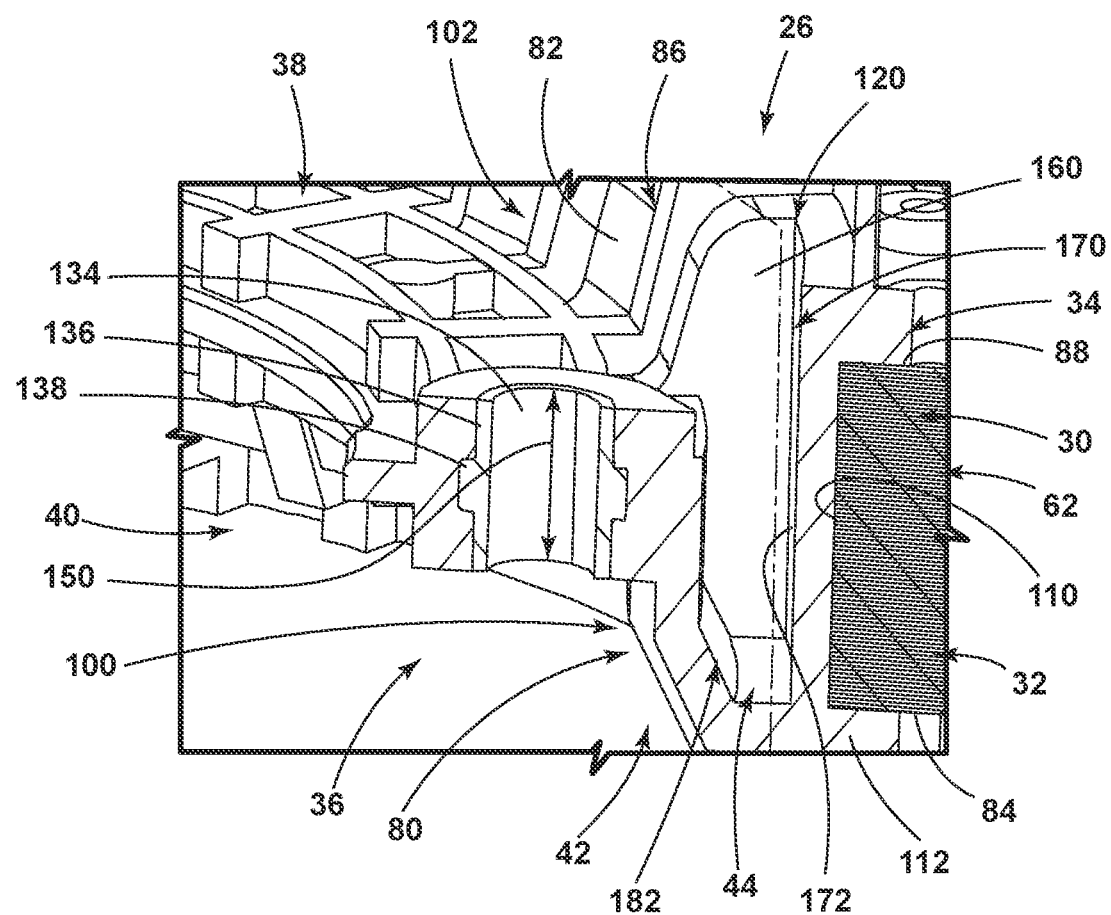
FIG. 15 is a cross-sectional view of the stator of FIG. 14 taken along line XV-XV.
Figure 16:
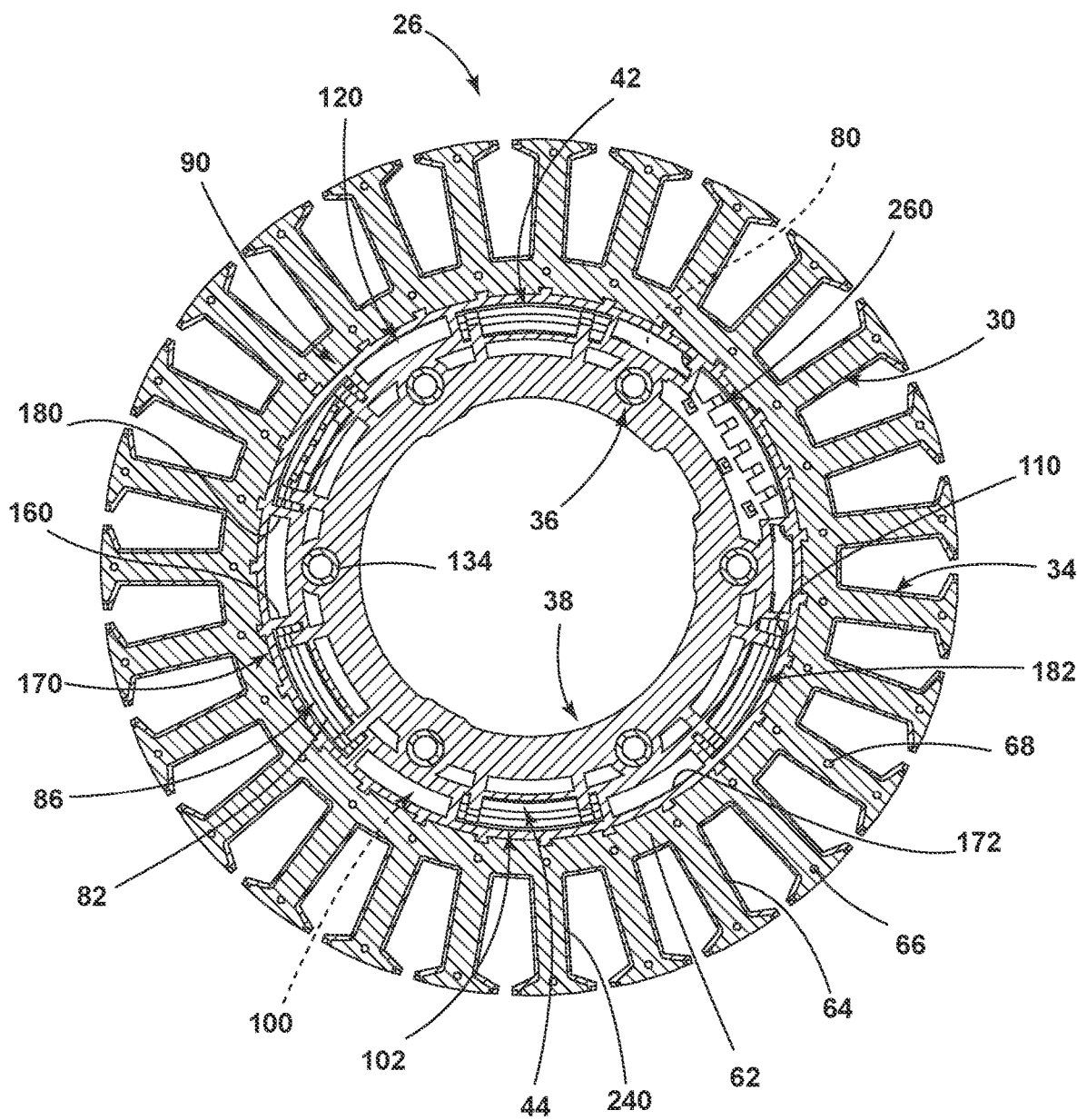
FIG. 16 is a cross-sectional view of the stator of FIG. 14 taken along line XVI-XVI.
Figure 17:
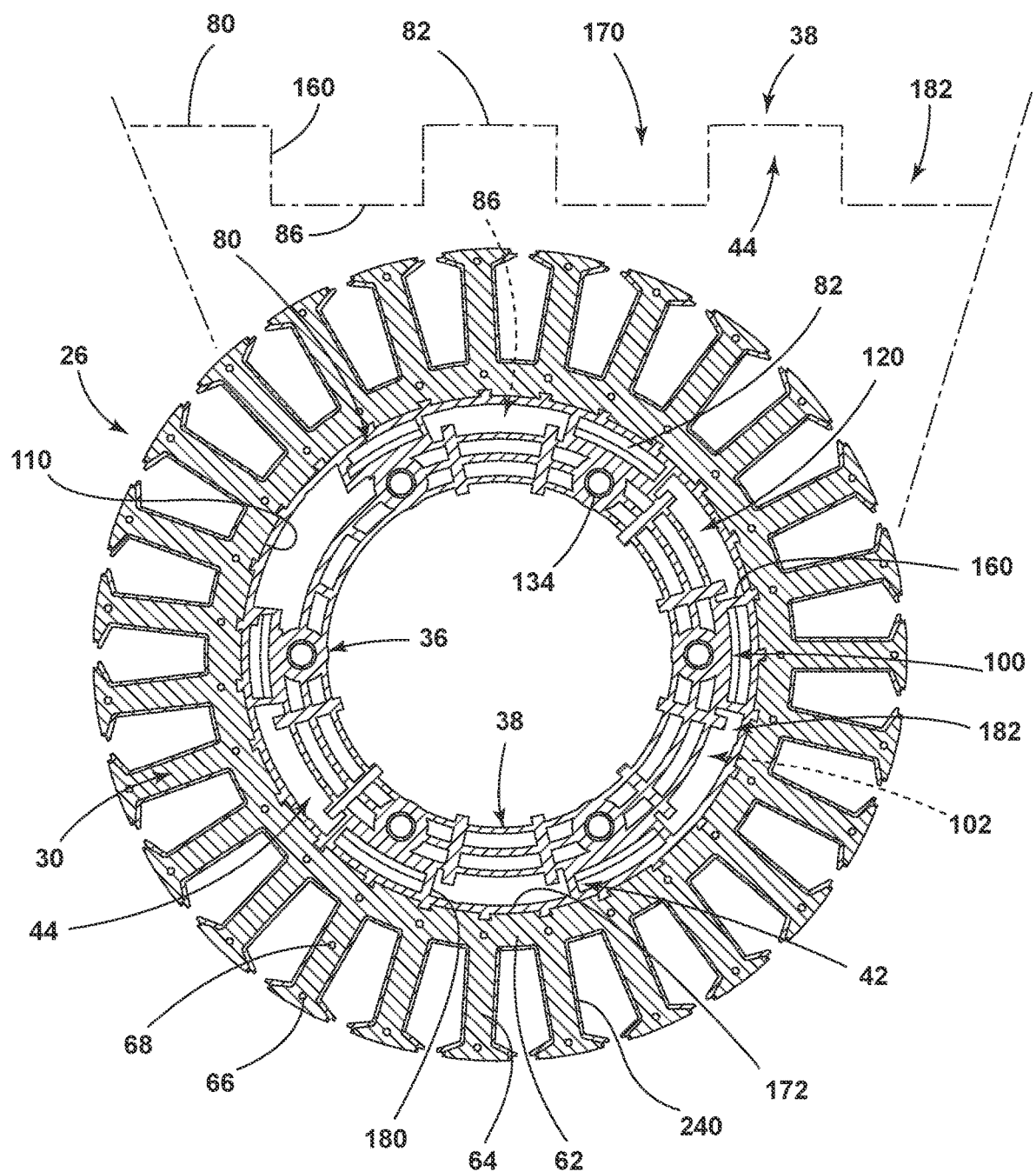
FIG. 17 is a cross-sectional view of the stator of FIG. 14 taken along line XVII-XVII, and showing a schematic of the undulating reinforcing structure of the bridge section.
Figure 18:
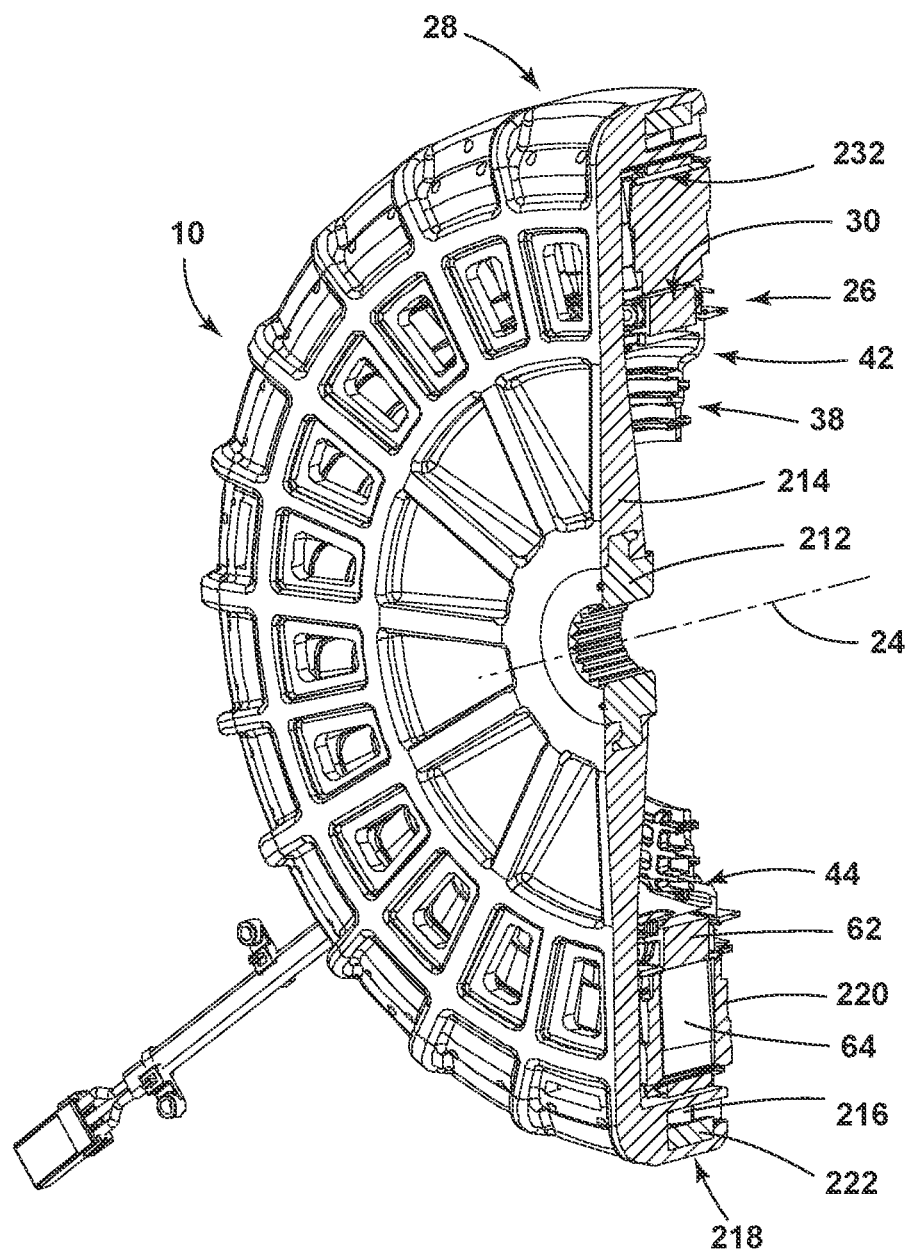
FIG. 18 is a cross-sectional view of the stator and rotor for an aspect of the electric motor.
Figure 19:
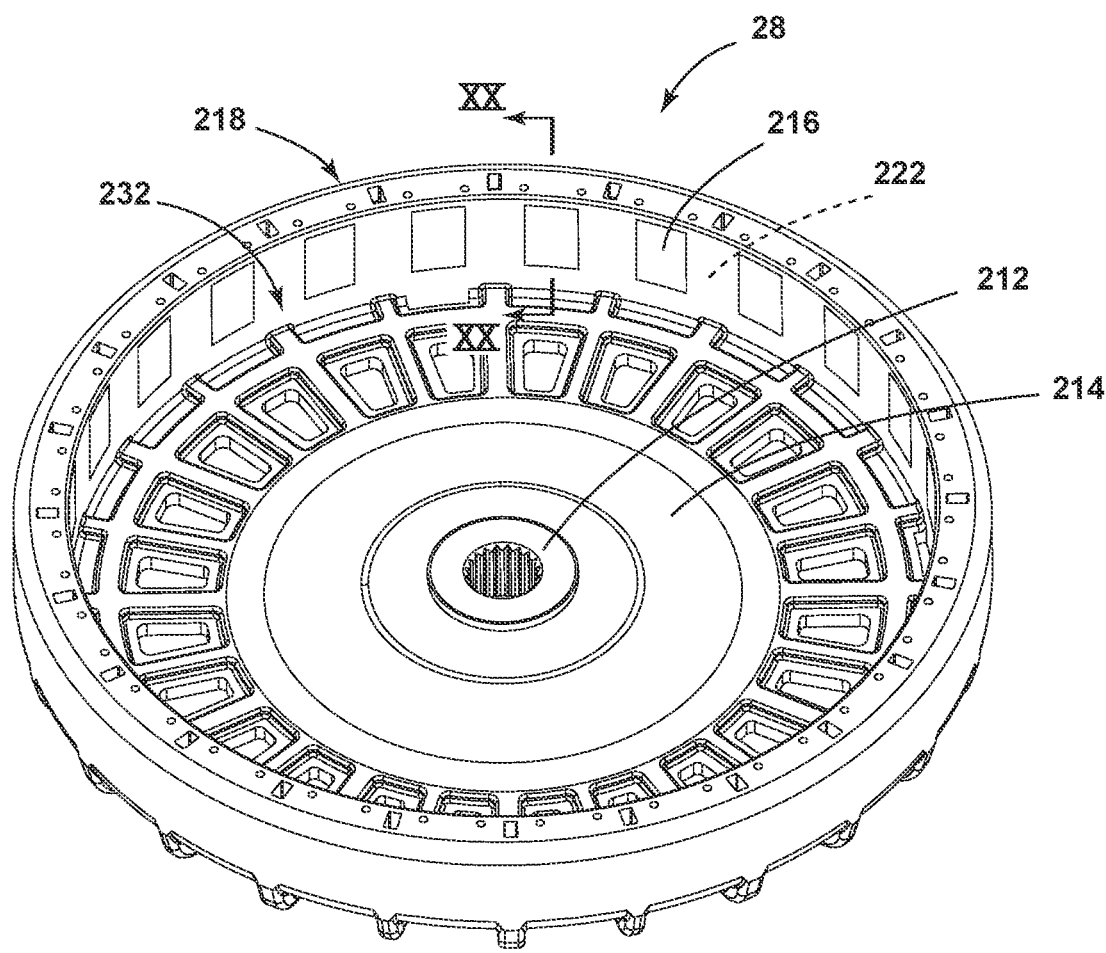
FIG. 19 is a perspective view of an aspect of the rotor for an electric motor.
Figure 20:
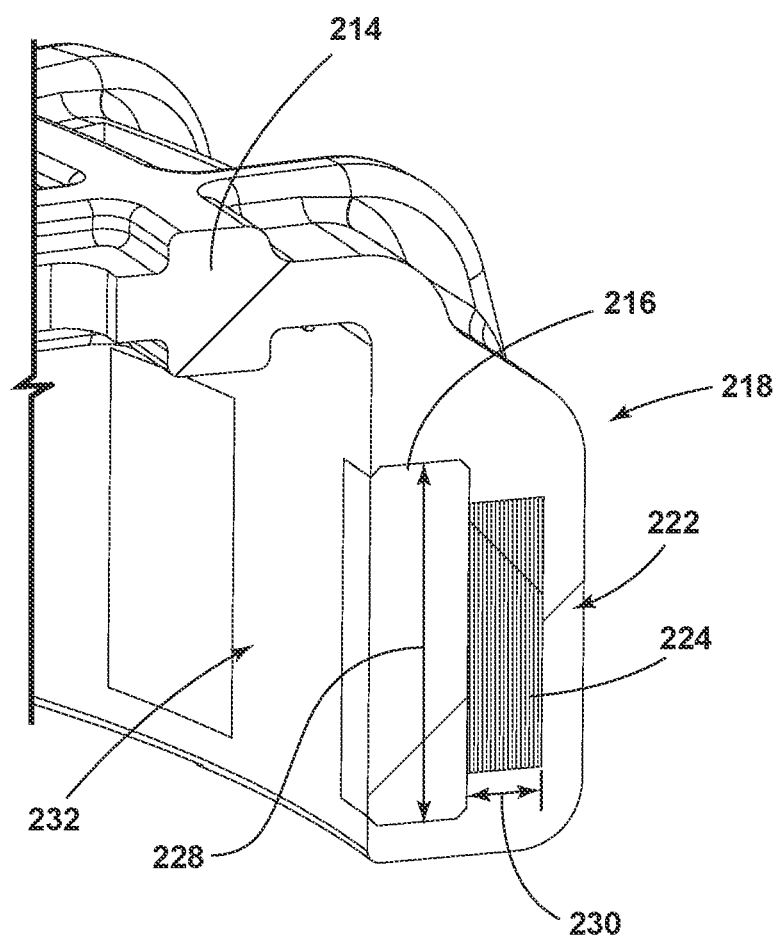
FIG. 20 is a cross-sectional view of the rotor of FIG. 20 taken along line XXI-XXI.
Figure 21:
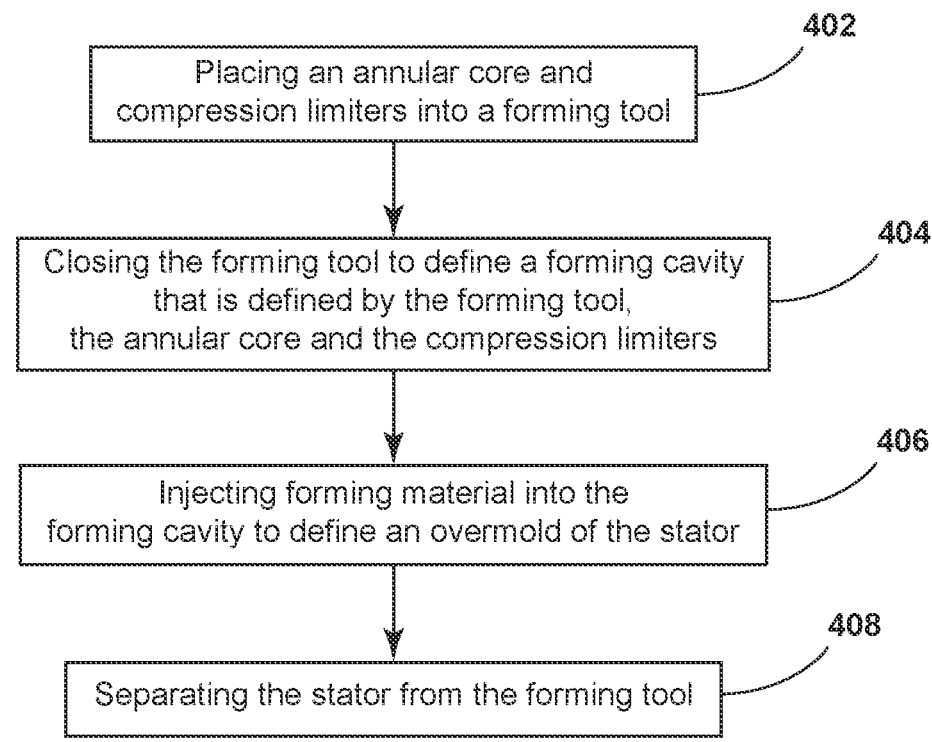
FIG. 21 is a linear flow diagram illustrating a method for forming a stator for an electric motor.

The components in the figures are not necessarily to scale, emphasis instead being placed upon illustrating the principles described herein.

DETAILED DESCRIPTION

The present illustrated embodiments reside primarily in combinations of method steps and apparatus components related to an electric motor for a laundry appliance having an overmold with an outer core section, a fastening interior section and a bridge section extending therebetween. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With respect to FIGS. 1-5, reference numeral 10 generally refers to an electric motor for an appliance 12, typically a laundry appliance 12. The electric motor 10 is used to rotate certain components of the laundry appliance 12, such as a rotating drum 14, an agitator, an impeller, and other rotationally operable components when the electric motor 10 is in a direct-drive configuration 16. An electric motor 10 can also be in a belt-drive configuration (shown in dashed line in FIGS. 1 and 2). In the belt-drive configuration, the electric motor 10 can be used for operating the rotating drum 14, an impeller or agitator, a fluid pump, a blower and other similar rotational components. Typically, the electric motor 10 described herein will be used in a direct drive configuration and attached to a back wall 18 of a structural tub 20.

Referring again to FIGS. 1-13, the electric motor 10 for the appliance 12 can be attached to the back wall 18 of the tub 20. A structural metallic hub 22 is insert injection molded within the back wall 18 of the tub 20 to define a rotational axis 24. A drum 14 is rotationally operable within the tub 20 along the rotational axis 24. The stator 26 for the electric motor 10 is attached to the metallic hub 22, and a rotor 28 rotationally operates relative to the stator 26 and the rotational axis 24. Typically, the rotor 28 rotates around an outside of the stator 26. In certain configurations, the rotor 28 can rotate within the rotor 28 or both inside and outside of the stator 26. As exemplified herein, the rotor 28 rotates about the stator 26 and about the rotational axis 24 that extends through the tub 20, the metallic hub 22, the stator 26, and the drum 14. The stator 26 includes an annular core 30 that is made up of a laminated structure 32. An overmold 34 extends around the core 30. The overmold 34 also extends inward of the core 30 to fastening portions 36 that are located within an interior section 38 of the overmold 34 that is located within a central area 40 defined by the annular core 30. A bridge section 42 of the overmold 34 extends from the interior section 38 to at least one of an area of the overmold 34 above the core 30 and an area of the overmold 34 below the core 30. Accordingly, the bridge section 42 that extends from the interior section 38 toward the core 30 engages the overmold 34 surrounding the core 30, referred to herein as the core portion 240 of the overmold 34. In addition, the bridge section 42 engages the core portion 240 in an area axially outside of the stacked laminated structure 32 that forms the annular core 30. In this manner, the bridge section 42 defines a toroidal cavity 44 that extends between the core 30 and the fastening portions 36. Using this configuration, the bridge section 42 provides axial support between the fastening portions 36 and the annular core 30 such that vibration of the stator 26 is minimized during operation of the appliance 12.

According to various aspects of the device, the laminated structure 32 of the annular core 30 can be in the form of a helically wound metallic plate 60 that is spirally wound to form the annular core 30. The metallic plate 60 that forms the annular core 30 can include a yoke 62 and teeth 64 that extend outwardly from the yoke 62, or inwardly in the case of inner-rotor configurations. As these laminations are helically or spirally wound to form the annular core 30, the stack of laminations that form the laminated structure 32 can be attached via rivets 66 that extend through portions of the laminated structure 32, and can also be welded together. In addition, various retaining tabs 68 can be stamped into the surface of the metallic plate 60 for joining the laminations together in the stacked configuration. When the helically wound metallic plate 60 is formed into the laminated structure 32, the annular core 30 forms a monolithic member that is formed through the helically or spirally wound metallic plate 60.

Referring now to FIGS. 7-13, the bridge section 42 of the stator 26 can include a first set 80 of bridge portions 82 that extend from the interior section 38 to an area proximate a first face 84 of the annular core 30. The bridge section 42 can also include a second set 86 of bridge portions 82 that extend from the interior section 38 to an area proximate a second face 88 of the annular core 30. The first and second faces 84, 88 of the annular core 30 are flat surfaces of the annular core 30 that oppose one another. The first and second faces 84, 88 also define the beginning and the ending of the helically or spirally wound metallic plate 60 that forms the annular core 30. The first set 80 of bridge portions 82 and second set 86 of bridge portions 82 are typically positioned in an alternating configuration 90 about the interior section 38 and within the bridge section 42 of the stator 26. In addition, the toroidal cavity 44 that extends between the core 30 and fastening portions 36 is formed between the first and second sets 80, 86 of bridge portions 82.

The alternating configuration 90 of the first and second sets 80, 86 of bridge portions 82 is configured to allow for an injection molding process of the overmold 34 for the stator core 30 that uses a two-piece mold. This two-piece mold can form the overmold 34 for the stator 26 without the use of interior lifters. As discussed herein, the alternating configuration 90 of the first and second sets 80, 86 of bridge portions 82 provides structural integrity to the stator 26, and also provides for a more efficient forming process for the overmold 34 of the stator 26.

Referring again to FIGS. 1-13, the stator 26 for the electric motor 10 can include the annular core 30 that is made up of a helical metal plate that is spirally wound into the laminated structure 32. The overmold 34 extends around the core 30 and also defines the interior section 38 and a bridge section 42 that extends between the core 30 and the interior section 38. The interior section 38 includes stator fastening portions 36 that are used to attach the stator 26 to the structural metallic hub 22 within the tub 20. The bridge section 42 includes a first radial structure 100 that extends from the interior section 38 to the core 30. The bridge section 42 also includes a second radial structure 102 that extends from the interior section 38 to the core 30. The core 30, the interior section 38 and the first and second radial structures 100, 102 define the toroidal cavity 44 within the bridge section 42.

Referring again to FIGS. 6-13, the first set 80 of bridge portions 82 can be included within the first radial structure 100 and the second set 86 of bridge portions 82 can be included within the second radial structure 102. Accordingly, the first and second radial structures 100, 102 extend from the interior section 38, around the toroidal cavity 44, and engage the overmold 34 outside of an inward-facing surface 110 of the annular core 30. Accordingly, the bridge section 42 of the stator 26 engages the overmold 34 of the core 30 at outer axial portions 112 of the overmold 34. This configuration provides structural integrity to the attachment between the core 30 and the interior section 38 to minimize vibrations, noise, and other unwanted frequency-type interference.

As discussed above, the first and second sets 80, 86 of bridge portions 82 can be spaced apart from one another to form an alternating configuration 90. In this manner, the bridge section 42 defines forming apertures 120 that extend through the first and second radial structures 100, 102 in the alternating configuration 90 described herein. Stated another way, the forming apertures 120 in the first radial structure 100 align with the second set 86 of bridge portions 82 of the second radial structure 102. Conversely, the forming apertures 120 in the second radial structure 102 align with the first set 80 of bridge portions 82 of the first radial structure 100. Again, this configuration of the forming apertures 120 is included to provide for a two-piece forming tool that can be used to form the overmold 34 without the use of lifters, or substantially without the use of lifters, during the forming process.

Referring now to FIGS. 1-5 and 9-10, the interior section 38 of the overmold 34 can include the fastening portions 36 for attaching the stator 26 to the metallic hub 22. The metallic hub 22 can include various bosses 130 that receive fasteners 132 that extend through the fastening portions 36 of the stator 26 and engage the hub 22 that is molded within the back wall 18 of the tub 20. The fastening portions 36 of the stator 26 include compression limiters 134 that are injection molded within the fastening portions 36 of the interior section 38 during the forming process of the stator 26. Each of the compression limiters 134 can include an outer wall 136 having an outwardly extending perimetrical ridge 138 that engages the interior section 38 of the overmold 34.

Within conventional stators, the compression limiting features included within fastener portions typically include a spring metal that is press fit into various apertures of the stator. This press fitting operating can suffer from inaccuracies, damage to the forming material, and other deficiencies. In addition, the spring metal used in these conventional configurations may have a depth that is different than the thickness of the fastener portions surrounding the spring metal. Such differences can result in deformation of the spring metal and/or the fastener portions of the conventional stator when fasteners are tightened to secure the conventional stator. Such deformation can result in damage to the conventional stator during installation and over time.

Referring again to FIGS. 9-10, using the compression limiters 134 having the outwardly extending perimetrical ridge 138, the compression limiters 134 are insert injection molded within the overmold 34 of the stator 26. This provides for a precise locating feature of the compression limiters 134. In addition, during the forming process of the overmold 34 for the stator 26, the compression limiters 134 are used to form at least a portion of the forming cavity that receives the forming material and defines the fastening portions 36. The use of the compression limiters 134 as part of the forming cavity ensures that the compression limiters 134 at the fastening portions 36 of the stator 26 are the same depth 150 as the overmold 34. Accordingly, stresses exerted upon the stator 26 while fastening the stator 26 to the bosses 130 of the hub 22 are directed through the compression limiters 134 and not through the material of the overmold 34.

In addition, using the outwardly extending perimetrical ridge 138 of the compression limiters 134 ensures that the compression limiters 134 will not slide or otherwise deflect in an axial direction with respect to the stator 26 or the metallic hub 22. The outwardly extending perimetrical ridge 138 ensures a stable location of the location limiters with respect to the overmold 34. Accordingly, the fastening interface between the stator 26 and the hub 22 is a secure interface that helps to prevent deformation of the overmold 34 during the installation process of the stator 26.

Referring now to FIGS. 14-18, the appliance 12 includes the tub 20 and the metallic hub 22 that is molded within the tub 20 to define the rotational axis 24. The drum 14 is rotationally operable within the tub 20 along the rotational axis 24. The stator 26 for the electric motor 10 is attached to the structural metallic hub 22 and a rotor 28 is rotationally operable relative to the stator 26. The stator 26 includes the annular core 30 that is made up of the laminated structure 32 that is typically formed from a helically or spirally wound metallic plate 60. The overmold 34 extends around the core 30 and also extends into a central area 40 of the core 30. Fastening portions 36 are located within this interior section 38 of the overmold 34 that is located within the central area 40 of the core 30. The bridge section 42 of the overmold 34 extends between the interior section 38 and the core 30. The bridge section 42 includes the first radial structure 100 and the second radial structure 102. In certain aspects of the device, the bridge section 42 can also include a reinforcing portion that provides additional axial support within the bridge section 42. This reinforcing portion can be in the form of an axial reinforcement 160.

In certain aspects of the device, the first radial structure 100, the axial reinforcement 160 and the second radial structure 102 cooperate to define an undulating reinforcing structure 170 that extends between the interior section 38 and the core 30. Stated another way, the first radial structure 100 extends from the interior section 38 and engages the overmold 34 of the core 30 outside of the first face 84 of the core 30. The second radial structure 102 extends from the interior section 38 and engages the overmold 34 outside of a second face 88 of the core 30. As discussed herein, the inner surface 172 of the core 30 and the first and second radial structures 100, 102 form the toroidal cavity 44 that extends between the core 30 and interior section 38 of the stator 26. The axial reinforcement 160 forms a portion of the bridge section 42 and extends between the first and second radial structures 100, 102. In this manner, the first radial structure 100, the second radial structure 102 and the axial reinforcement 160 form the undulating reinforcing structure 170 of the stator 26.

In certain aspects of the device, the axial reinforcement 160 can be located at edges 180 of the forming apertures 120 that are alternately positioned within the first radial structure 100 and the second radial structure 102. Accordingly, the first set 80 of bridge portions 82 of the first radial structure 100 and the second set 86 of bridge portions 82 of the second radial structure 102 can be connected together using the axial reinforcements 160. The axial reinforcements 160 can be used to at least partially divide the toroidal cavity 44 into various arcuate reinforcing sections 182 of the bridge section 42. The axial reinforcement 160 can extend the full distance between the core 30 and the interior section 38 of the stator 26. In certain aspects, the axial reinforcement 160 can extend only a portion of the way between the core 30 and the interior section 38. In such a configuration, the toroidal cavity 44 is a continuous space that extends between the interior section 38 and the core 30.

In the various aspects of the device, as exemplified in FIGS. 1-18, the axial reinforcement 160 can be utilized in certain designs of the stator 26 that may require reinforcement at certain operational frequencies of a particular appliance 12. In addition, the exact configuration of the axial reinforcement 160 can vary depending upon the exact design of the stator 26 and the design of the appliance 12. It is contemplated that the axial reinforcements 160 can be utilized for fully dividing sections of the toroidal cavity 44 such that the axial reinforcement 160 defines a wall that extends between the core 30 and the interior section 38 of the overmold 34 for the stator 26.

Referring again to FIGS. 7-18, the individual bridge portions 82 that are positioned within the first and second radial structures 100, 102 can be equally sized such that the first set 80 of bridge portions 82 and the second set 86 of bridge portions 82 have a consistent arcuate length throughout the bridge section 42 of the stator 26. It is also contemplated that the first set 80 of bridge portions 82 and the second set 86 of bridge portions 82 can have different sizes. In addition, the first set 80 of bridge portions 82 and the second set 86 of bridge portions 82 can include radial reinforcements 190 that extend outside the toroidal cavity 44 between the interior section 38 and the core 30. These radial reinforcements 190 can vary in number and size depending upon the configuration of the stator 26 that is to be placed within a particular appliance 12. In addition, these radial reinforcements 190 can extend continuously from the interior section 38 to areas outside the first and second faces 84, 88 of the annular core 30.

Referring now to FIGS. 1-5 and 19-21, the rotor 28 for the electric motor 10 is configured to rotationally operate about the stator 26 to define an electromotive force that drives a drive shaft 210 for rotating a rotating drum 14 positioned within the tub 20. The rotor 28 includes a central metallic coupler 212 that engages the drive shaft 210 and attaches to the body 214 of the rotor 28. The body 214 of the rotor 28 is typically made of a bulk molding compound that is molded over the central coupler 212. The rotor 28 also includes a plurality of magnets 216 positioned at an outer wall 218 of the rotor 28. These magnets 216 interact with the windings 220 of the stator 26 to define the electromotive force that rotates the rotor 28 about the stator 26. The magnets 216 are included within the bulk molding compound that forms the body 214 of the rotor 28. According to various aspects of the device, the material of the rotor 28 can include any one of various molding materials. These materials can include, but are not limited to, bulk molding compounds, polypropylene, composite materials, and other polymer materials. The rotor 28 can also include a metallic plate that is used as the main structure of the rotor 28 or is formed with one or more polymer materials or bulk molding compounds to form a composite structure of the rotor 28.

Referring again to FIGS. 1-5 and 19-21, a metallic back iron 222 is positioned proximate the magnets 216 of the rotor 28 and is typically made of a metallic material such as steel. In forming the back iron 222 of the rotor 28, a band 224 of steel can be wound or wrapped around the plurality of magnets 216 to form the back iron 222. The wrapped band 224 of steel that forms the back iron 222 is wound such that the width 228 of the band 224 is also the width 228 of the completed back iron 222. Layering the band 224 of steel increases the cross-sectional thickness 230 of the back iron 222. This process ensures a consistent thickness 230 of the back iron 222. The back iron 222 that is made up of the wrapped band 224 of steel provides proficiency in concentrating magnetic flux toward an inner portion 232 of the rotor 28. This serves to efficiently generate the electromotive force that is defined between the magnets 216 of the rotor 28 and the energized windings 220 of the stator 26. This configuration of the back iron 222 directs the magnetic flux toward the energized windings 220 of the stator 26 during operation of the electric motor 10. In various aspects of the device, it is contemplated that the back iron 222 can be a segmented back iron formed from a plurality of arcuate sections. Other configurations of the back iron 222 are also contemplated. These configurations can include, but are not limited to, laminated back iron 222, a steel can back iron 222 and other similar configurations.

Referring now to FIGS. 1-22, having described various aspects of the electric motor 10, a method 400 is disclosed for forming a stator 26 for the electric motor 10. According to the method 400, the annular core 30 and compression limiters 134 are placed into a forming cavity of a two-piece forming tool (step 402). The forming tool is closed to form the forming cavity, where the forming cavity is also defined by the outer surface of the core 30 and the outer wall 136 and outwardly extending perimetrical ridge 138 of the compression limiters 134 (step 404). The two-piece forming tool that forms the forming cavity is operated without the use of lifters. Accordingly, the two-piece forming tool includes an upper half and a lower half that form the interior cavity into which the forming material is injected. According to the method 400, the molding material is injected into the forming cavity to form around the core 30 and the compression limiters 134 (step 406). The forming tool is then separated and the formed stator 26 is removed from the forming cavity (step 408). As discussed herein, the forming tool operates without the use of lifters to form the structure of the stator 26. The structure of the stator 26 includes a bridge section 42 having an undulating reinforcing structure 170 that extends between the compression limiters 134 and the core 30 (step 408). In addition, using this method 400, the toroidal cavity 44 of the bridge section 42 can be formed between the interior section 38 of the overmold 34 and the portion of the core portion 240 of the overmold 34 that extends around the core 30. Using this configuration, the toroidal cavity 44 can help to provide axial reinforcement 160 between the fastening portions 36 of the stator 26 and the core 30 of the stator 26. This serves to minimize noise, vibration, and other undesirable frequencies within the stator 26 during operation of the appliance 12.

According to various aspects of the device, the bridge section 42 of the overmold 34 can extend from the interior section 38 to the core portion 240 of the overmold 34 extending around the annular core 30. In certain aspects of the device, the bridge section 42 can include only one of the first radial structure 100 and the second radial structure 102. In such an aspect of the device, the bridge section 42 can include various forming apertures 120 that are positioned within the bridge section 42. Typically, these forming apertures 120 are positioned near the fastening portions 36 of the stator 26 within the interior section 38 of the overmold 34. These apertures can be used during the forming process to avoid molding steel that may be set within the overmold 34 for the stator 26.

By way of example and not limitation, the stator 26 for the electric motor 10 can include (27) teeth 64 that extend around the yoke 62 of the annular core 30. After being overmolded, winding wires are wound around the various teeth 64 to form poles 250 of the stator 26 that can be energized in certain configurations to interact with the magnets 216 of the rotor 28 and provide varying degrees of electromotive force for rotating the rotor 28 about the stator 26. In an exemplary and non-limiting aspect of the device, the rotor 28 can include (24) magnets 216. It should be understood that the number of teeth 64 of the stator 26, the number of poles 250, and the number of magnets 216 can vary depending on the design of the electric motor 10 and the appliance 12.

Referring again to FIGS. 1-18, the overmold 34 of the stator 26 can include various connections 260. These connections can include a receptacle for receiving a harness that connects with a three-phase jumper that is integrally formed within the overmold 34 of the stator 26. In this location, according to various aspects of the device, the three wires can be attached to a single connector 260 where the wires are coupled together and crimped to or otherwise coupled to form a short bar location that is used to prevent short circuit events with respect to the stator 26. The connections 260 can also include power connections where three dedicated connectors can be coupled to the three wires of the three-phase windings 220 of the stator 26. These connections 260 are integrally formed into the overmold 34 so that the various wires can be securely and consistently connected to the various connectors that engage the stator 26. The wires that form the windings 220 that are wound around the teeth 64 can be extended to these connections 260 such that an electrical connection between a controller, inverter or other similar electrical interface can be connected directly to the stator 26. Using these connections 260 that are injection molded within the overmold 34 of the stator 26, a sealer is typically not used for attaching the harness to the harness connection 260 of the stator 26. These connections 260 of the stator 26 can include one or more connection for each phase for the windings 220 for the stator 26, as well as a ground connection. In addition, the various connections 260 can include one or more data interface locations for receiving certain positioning information relating to the position of the rotor 28 with respect to the stator 26. Accordingly, various Hall effect sensors, rotational sensors, positioning sensors, and other similar configurations can be included within the stator 26. It is also contemplated that the positioning interface between the stator 26 and the rotor 28 can be a sensorless configuration.

According to another aspect of the present disclosure, an electric motor for an appliance includes a tub. A metallic hub is molded within the tub to define a rotational axis. A drum is rotationally operable within the tub along the rotational axis. A stator is attached to the metallic hub and a rotor rotationally operates about the stator. The stator includes an annular core made up of a laminated structure. An overmold extends around the core. Fastening portions are located within an interior section of the overmold that is located within a central area of the core. A bridge section of the overmold extends from the interior section to at least one of an area above the core and an area below the core. The bridge section defines a toroidal cavity that extends between the core and the fastening portions.

According to another aspect, the laminated structure includes a helically wound metallic plate.

According to yet another aspect, the bridge section include a first set of bridge portions that extend from the interior section to an area below the core. The bridge section includes a second set of bridge portions that extend from the interior section to an area above the core. The first set of bridge portions and the second set of bridge portions are in an alternating configuration about the interior section.

According to another aspect of the present disclosure, the overmold includes a reinforcing portion that at least partially divides the toroidal cavity into toroidal sections.

According to another aspect, the reinforcing portion, the first set of bridge portions and the second set of bridge portions define an undulating reinforcing structure that extends between the core and the interior section.

According to yet another aspect, the fastening portions of the stator include compression limiters that are injection molded within the interior section.

According to another aspect of the present disclosure, each compression limiter includes an outer wall having an outwardly extending perimetrical ridge that engages the interior section of the overmold.

According to another aspect, the rotor includes a plurality of magnets and a metallic back iron that extends around the magnets.

According to yet another aspect, the metallic back iron includes a wrapped band of steel.

According to another aspect of the present disclosure, the rotor includes a central coupler and a body that surrounds the coupler, the magnets and the back iron. The body includes a bulk molding compound.

According to another aspect, a stator for an appliance motor includes an annular core made up of a metallic plate that is spirally wound into a laminated structure. An overmold extends around the core and further defines an interior section and a bridge section that extends between the core and the interior section. The interior section includes stator fastening portions that are used to attach the stator to a tub. The bridge section includes a first radial structure that extends from the interior section to the core. The bridge section includes a second radial structure that extends from the interior section to the core. The core, the interior section and the first and second radial structures define a toroidal cavity within the bridge section.

According to yet another aspect, the bridge section defines forming apertures that extend through the first and second radial structures in an alternating configuration.

According to another aspect of the present disclosure, the bridge section further includes axial reinforcements that extend between the first and second radial structures.

According to another aspect, the axial reinforcements and the first and second radial structures define an undulating reinforcing structure of the bridge section.

According to yet another aspect, each of the fastening portions includes a comprising compression limiter having an outer wall with an outwardly extending perimetrical ridge that engages the interior section of the overmold.

According to another aspect of the present disclosure, the compression limiters and the annular core are insert injection molded within the overmold.

According to another aspect, an electric motor for an appliance includes a tub. A metallic hub is molded within the tub to define a rotational axis. A drum is rotationally operable within the tub along the rotational axis. A stator is attached to the metallic hub and a rotor rotationally operates about the stator. The stator includes an annular core made up of a laminated structure. An overmold extends around the core and extends into a central area of the core. Fastening portions are located within an interior section of the overmold that is located within the central area of the core. A bridge section of the overmold extends from the interior section to the core. The bridge section includes a first radial structure, a second radial structure and an axial reinforcement. The first radial structure, the axial reinforcement and the second radial structure defines an undulating reinforcing structure that extends between the interior section and the core.

According to yet another aspect, the core, the interior section and the first and second radial structures define a toroidal cavity within the bridge section.

According to another aspect of the present disclosure, the axial reinforcements at least partially divide the toroidal cavity into arcuate reinforcing sections of the bridge section.

According to another aspect, the rotor includes a plurality of magnets and a metallic back iron that extends around the magnets. The metallic back iron includes a wrapped band of steel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An electric motor for an appliance comprising:
   a tub;
   a metallic hub molded within the tub to define a rotational axis;
   a drum that is rotationally operable within the tub along the rotational axis; and
   a stator attached to the metallic hub and a rotor that rotationally operates about the stator, the stator comprising:
   an annular core made up of a laminated structure;
   an overmold that extends around the core;
   fastening portions located within an interior section of the overmold that is located within a central area of the core wherein the fastening portions of the stator include compression limiters that are injection molded within the interior section, wherein each compression limiter includes an outer wall having an outwardly extending perimetrical ridge that engages the interior section of the overmold; and
   a bridge section of the overmold that extends from the interior section to at least one of an area above the core and an area below the core, the bridge section defining a toroidal cavity that extends between the core and the fastening portions.

2. The electric motor of claim 1, wherein the laminated structure includes a helically wound metallic plate.

3. The electric motor of claim 1, wherein the bridge section include a first set of bridge portions that extend from the interior section to an area below the core, and wherein the bridge section includes a second set of bridge portions that extend from the interior section to an area above the core, wherein the first set of bridge portions and the second set of bridge portions are in an alternating configuration about the interior section.

4. The electric motor of claim 3, wherein the overmold includes a reinforcing portion that at least partially divides the toroidal cavity into toroidal sections.

5. The electric motor of claim 4, wherein the reinforcing portion, the first set of bridge portions and the second set of bridge portions define an undulating reinforcing structure that extends between the core and the interior section.

6. The electric motor of claim 1, wherein the rotor includes a plurality of magnets and a metallic back iron that extends around the magnets.

7. The electric motor of claim 6, wherein the metallic back iron includes a wrapped band of steel.

8. The electric motor of claim 6, wherein the rotor includes a central coupler and a body that surrounds the central coupler, the magnets and the metallic back iron, wherein the body includes a bulk molding compound.

9. A stator for an appliance motor, the stator comprising:
   an annular core made up of a metallic plate that is spirally wound into a laminated structure; and
   an overmold that extends around the core and further defines an interior section and a bridge section that extends between the core and the interior section, wherein,
   the interior section includes stator fastening portions that are used to attach the stator to a tub wherein each of the stator fastening portions includes a compression limiter having an outer wall with an outwardly extending perimetrical ridge that engages the interior section of the overmold;

the bridge section includes a first radial structure that extends from the interior section to the core;

the bridge section includes a second radial structure that extends from the interior section to the core; and the core, the interior section and the first and second radial structures define a toroidal cavity within the bridge section.

10. The stator of claim 9, wherein the bridge section defines forming apertures that extend through the first and second radial structures in an alternating configuration.

11. The stator of claim 9, wherein the bridge section further includes axial reinforcements that extend between the first and second radial structures.

12. The stator of claim 11, wherein the axial reinforcements and the first and second radial structures define an undulating reinforcing structure of the bridge section.

13. The stator of claim 9, wherein the compression limiters and the annular core are insert injection molded within the overmold.

14. An electric motor for an appliance comprising:

a tub;

a metallic hub molded within the tub to define a rotational axis;

a drum that is rotationally operable within the tub along the rotational axis; and a stator attached to the metallic hub and a rotor that rotationally operates about the stator, the stator comprising:

an annular core made up of a laminated structure;

an overmold that extends around the core and extends into a central area of the core;

fastening portions located within an interior section of the overmold that is located within the central area of the core wherein each of the fastening portions includes a compression limiter having an outer wall with an outwardly extending perimetrical ridge that engages the interior section of the overmold; and a bridge section of the overmold that extends from the interior section to the core, the bridge section having a first radial structure, a second radial structure and an axial reinforcement, wherein the first radial structure, the axial reinforcement and the second radial structure defines an undulating reinforcing structure that extends between the interior section and the core.

15. The electric motor of claim 14, wherein the core, the interior section and the first and second radial structures define a toroidal cavity within the bridge section.

16. The electric motor of claim 15, wherein the axial reinforcement at least partially divides the toroidal cavity into arcuate reinforcing sections of the bridge section.

17. The electric motor of claim 14, wherein the rotor includes a plurality of magnets and a metallic back iron that extends around the magnets, and wherein the metallic back iron includes a wrapped band of steel.

* * * * *